United States Patent [19]

Dolby

[11] 3,775,705

[45] Nov. 27, 1973

[54] COMPRESSOR AND EXPANDER CIRCUITS HAVING CONTROL NETWORK RESPONSIVE TO SIGNAL LEVEL IN CIRCUIT

[75] Inventor: Ray Milton Dolby, London, England

[73] Assignee: Dolby Laboratories Inc., New York, N.Y.

[22] Filed: Mar. 8, 1972

[21] Appl. No.: 232,887

[30] Foreign Application Priority Data

Mar. 12, 1971 Great Britain .................... 6,747/71

[52] U.S. Cl. .................... 333/14, 179/1 P, 330/126

[51] Int. Cl. .............................................. H04b 1/64

[58] Field of Search ....................... 333/14; 330/126; 325/62, 65; 179/1 P, 1 G, 1 M, 100.2 K

[56] References Cited

UNITED STATES PATENTS

| | | | |
|---|---|---|---|
| 2,958,831 | 11/1960 | Clark | 333/14 X |
| 3,188,581 | 6/1965 | Palmer | 325/65 X |
| 3,229,038 | 1/1966 | Richter | 333/14 X |

*Primary Examiner*—Paul L. Gensler
*Attorney*—Robert F. O'Connell

[57] ABSTRACT

Compressor and expander circuits are constructed by combining the outputs of two circuit paths, both connected to an input terminal. The combining is effected by a variable combining means which responds to a signal level in the circuit to vary the proportions in which the two circuit paths contribute to the output signal.

24 Claims, 6 Drawing Figures

COMPRESSOR AND EXPANDER CIRCUITS HAVING CONTROL NETWORK RESPONSIVE TO SIGNAL LEVEL IN CIRCUIT

This invention relates to circuits which modify the dynamic range of an output signal — that is to say, signal compressors which compress the dynamic range and signal expanders which expand the dynamic range. Compressors and expanders are sometimes required to work independently of each other; more often, however, the compressor compresses the dynamic range of an input signal before the signal is transmitted or recorded. A complementary expander expands the dynamic range of the received signal or the signal played back from the recording i.e., the expander restores the linearity of the dynamic range relative to the input signal. Noise introduced during transmission or the record/replay process is substantially reduced, and the compressor-expander combination therefore acts as a noise reduction system.

It is possible to employ a circuit with an inherently non-linear characteristic, e.g., a square law circuit, as a compressor or expander. Such a circuit operates as an instantaneous compressor or expander, but unavoidably introduces intermodulation distortion and other deleterious effects, particularly in the case of audio signals.

It is also possible to employ a circuit which operates linearly on individual cycles of the input signal but which is so controlled as to establish a non-linear characteristic versus mean signal level, as in so-called syllabic or linear compressors or expanders.

The object of this invention is to provide simplified circuits in which the compressed or expanded characteristic is built up from a plurality of individual circuits whose characteristics are all essentially linear with respect to dynamic range, without, however, introducing distortions or signal level uncertainties at very low and very high levels, which is of particular importance in noise reduction systems.

The invention therefore concerns circuits for modifying, within a predetermined dynamic range, the dynamic range of an input signal, comprising first and second circuit paths for conducting signal components from an input terminal to an output terminal. As in the circuits disclosed, for example, in U.S. Pat. applications Ser. Nos. 173,261 and 227,144 in the name of Ray Milton Dolby, the compression or expansion characteristic is built up by combining the outputs of the two paths.

In contrast to these and other prior disclosures, however, in the present invention the characteristics of the two paths are in themselves invariant and the compression or expansion characteristic is built up by employing a variable combining means which treats the outputs of the two paths, the combining and selecting being done in such manner that at both low and high levels the signal is wholly unaffected by variations and imperfections in the combining means.

According to the invention in one aspect, there is provided a signal compressor for reducing, within a predetermined input dynamic range, the dynamic range of an input signal, comprising first and second circuit paths for conducting signal components from an input terminal to an output terminal, characterised in that each circuit path is linear with respect to dynamic range in its operation, and in that the two circuit paths are coupled to the output terminal through variable combining means arranged so to respond to one or more signal levels, or differences in levels, in the circuit that, at low and high levels of the predetermined input dynamic range the signal reaching the output terminal is contributed substantially completely by the first and second circuit paths respectively, whereas at intermediate levels of the predetermined range the signal reaching the output terminal comprises components contributed by both circuit paths, the circuit path gains and the combining means being so arranged that the output signal is boosted at low levels relative to the output signal at high levels.

At least one of the paths may include a filter. If this is included in the first path its basic function is to render the compressor frequency selective. If however a filter is included in the second path, as well as rendering the compressor action frequency selective, the effect is to superimpose an equalization characteristic on the compressor characteristic. This can be of assistance in conforming to predetermined equalization characteristics in transmission or recording. Equalization is of great importance also in reception or play-back of signals, and another object of the invention is to provide an expander which can provide this facility.

Further according to the invention there is provided a signal expander for increasing, within a predetermined input dynamic range, the dynamic range of an input signal, comprising first and second circuit paths for conducting signal components from an input terminal to an output terminal, characterised in that each circuit path is linear with respect to dynamic range in its operation, the second circuit path including a filter with predetermined characteristics, and in that the two circuit paths are coupled to the output terminal through variable combining means arranged so to respond to one or more signal levels, or difference in levels, in the circuit that, at low and high levels of the predetermined input dynamic range the signal reaching the output terminal is contributed substantially completely by the first and second circuit paths respectively, whereas at intermediate levels of the predetermined range the signal reaching the output terminal comprises components contributed by both circuit paths, the circuit path gains and the combining means being so arranged that the output signal in at least part of the frequency band is attenuated at low levels relative to the output signal at high levels.

In an expander, problems can arise in controlling the variable combining means, particularly when the control is effected by a smoothed control signal derived from some part of the expander in order to achieve a syllabic expander action. If this signal is derived from a point where the dynamic range of the signal is large it is difficult to arrange for the control signal to return rapidly to a low value when the information signal in the expander falls rapidly to a low level.

According to the invention in yet another aspect there is provided a signal expander for increasing, within a predetermined input dynamic range, the dynamic range of an input signal, comprising first and second circuit paths for conducting signal components from an input terminal to an output terminal, characterised in that the first circuit path includes a filter with predetermined characteristics, that each circuit path is linear with respect to dynamic range in its operation, and in that the two circuit paths are coupled to the output terminal through variable combining means arranged so to respond to the current through or voltage across a variable element of the variable combining means that, at low and high levels of the predetermined input dynamic range, the signal reaching the output terminal is contributed substantially completely by the first and second circuit paths respectively, whereas at intermediate levels of the predetermined range the signal reaching the output terminal comprises components contributed by both circuit paths, the circuit path gains and the combining means being so arranged that the output signal in at least a part of the frequency band is attenuated at low levels relative to the output signal at high levels.

If both circuit paths act linearly with respect to dynamic range, no signal distortion is introduced at high and low levels. In noise reduction systems it is sufficient to treat only the low level portion of the dynamic range — e.g., levels less than −20 dB, −40 dB, or even −60 dB with respect to the nominal maximum operating level (one, two or three orders of magnitude less). Any distortions introduced by the operation of the variable combining means (in changing from one signal path to the other) are therefore confined to very low levels, at which they are unobtrusive. For applications such as video (television) in which non-linear distortion introduced by the compressor can effectively be compensated by the expander, it is possible to use non-linear elements, such as diodes, in the variable combining means. For audio applications the combining means can be arranged to vary in response to a rectified and smoothed signal, whereby a syllabic action is achieved. The control signal can be derived from a number of places in the circuit, such as the input of the output, but it is particularly advantageous to derive the signal from the current through or the voltage across a variable element of the variable combining means — i.e., from parts of the circuit in which the current or voltage is restricted, by the action of the circuit, to a small value at high levels. This approach may require the use of a differential amplifier, but it has the advantage that the control voltage does not build up to excessively large values at high signal levels.

Compressors and expanders are frequently required to act selectively in a predetermined frequency band. This can be achieved in the present invention by incorporating a filter in either or both paths. The action of the circuit is then non-linear versus frequency but, at any given frequency, the actions of the path remain linear with respect to dynamic range. To ensure that this condition is met, buffer amplifiers can be utilized to prevent the characteristics of the filters being influenced by the variable combining means.

The invention can also be extended to the use of any number of paths, the variable combining means selecting the outputs of the paths according to level or other characteristics of the signal (e.g., amplitude-frequency distribution, transient characteristics, or phase characteristics). Such techniques can be used for the creation of special audio or video effects.

Phase shift networks placed in either or both paths are sometimes useful, particularly for optimising the overall response characteristics when filters are used.

Both compressors and expanders are separately described below, but it is also possible to effect a change of mode by the use of a negative feedback amplifier, a compressor or expander being put into the feedback loop to produce expander or compressor action, respectively.

Circuits may be designed for compressing or expanding carrier signals and their sidebands; filters adapted to deal with such signals may be used in either or both circuit paths.

The invention will be described in more detail, by way of example, with reference to the accompanying drawings, in which.

THE COMPRESSOR CIRCUIT

Figure 1:
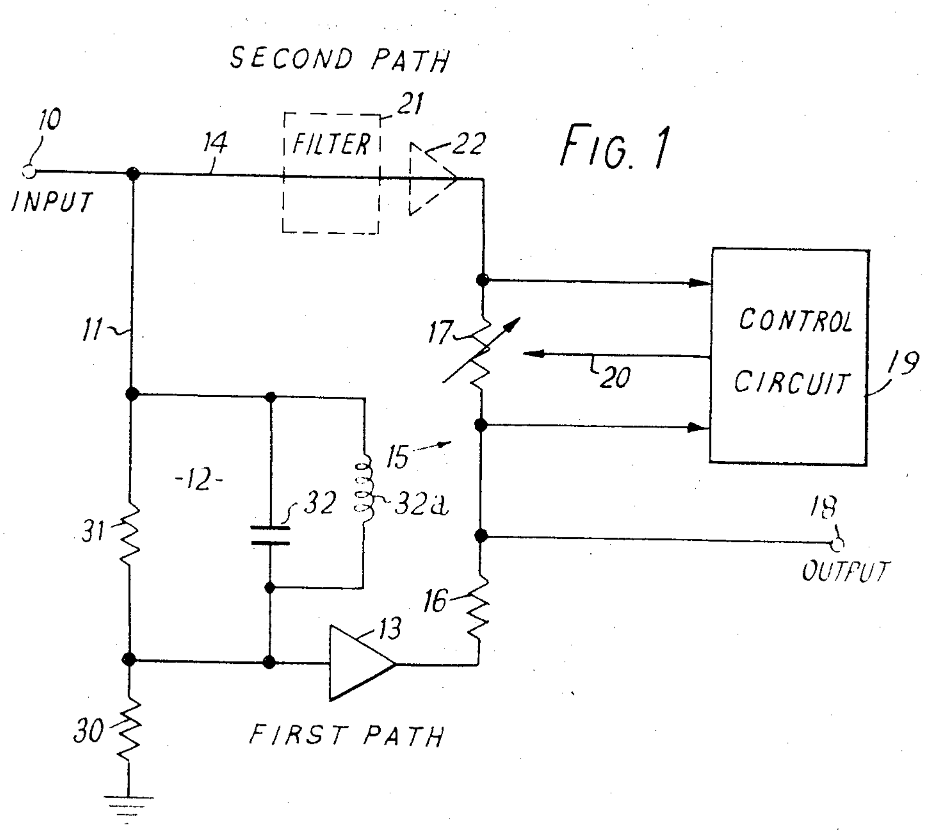
FIG. 1 is a circuit diagram of a compressor embodying the invention.

Referring to FIG. 1, an input terminal 10 is connected to a first circuit path 11 including a filter 12 and a buffer amplifier 13. A second circuit path is provided by a direct connection 14. This path can however optionally include a filter 21 and/or an amplifier 22 which can isolate the filter 21 from a combining circuit 15. The signals from the two paths are combined by the combining circuit 15 constituted by a fixed resistor 16 connected to the output of the amplifier 13 and a variable resistor 17 connected to the path 14. The junction of the resistors is connected to an output terminal 18.

The signal in the path 14 is sensed in some convenient manner by a control circuit 19, e.g., as shown, by sensing the voltage dropped across the variable resistor 17. The control circuit may be constituted as described below in relation to FIG. 3, producing a control signal on a line 20 which controls the value of the variable resistor 17. The circuit is so arranged that, when the signal in the path 14 is low — that is, when the input signal is in the low level portion of the input signal dynamic range, and accordingly when the voltage across the resistor 17 is low — the circuit 19 causes the resistor 17 to assume a high value such that the signal appearing at the output terminal 18 is contributed almost exclusively by the first path 11. On the other hand, when the signal is in the high level portion of the dynamic range, the resistor 17 is caused to assume a very low value, whereby there is virtually a direct connection through the path 14 from the input terminal 10 to the output terminal 18. Clearly the signal appearing at the output terminal 18 is then contributed almost exclusively by the second path 14.

The circuit path 14 is completely linear and the path 11 is linear with respect to dynamic range, even though it is not (as discussed below) linear with respect to frequency. The characteristics of the two paths may therefore be drawn on a decibel plot as two straight lines 11*a* and 14*a* in FIG. 2 extending in the same direction but displaced from each other because the output level of the path 11 is increased relative to that of the path 14 by the amplifier 13. The actual transfer characteristic of the complete circuit is shown by the more heavily drawn line and is built up from a low level portion 25 formed by part of the line 11*a*, when the resistor 17 has a high value, a high level portion 26 formed by part of the line 14*a*, when the resistor 17 has a very low value, and an intermediate portion 27 which effects a smooth transition from line 11a to line 14a as the resistor 17 assumes the range of intermediate values in which both paths contribute to the output signal in varying proportions.

In the characteristic as actually drawn it will be seen that an input dynamic range of 40 dB has been compressed to an output range of 30 dB. If therefore the compressor is used with a complementary expander it is possible to achieve 10 dB of noise reduction.

Returning to FIG. 1, the function of the filter 12 will now be explained. The filter is constituted by a series arm and a shunt resistor 30. The series arm consists of a resistor 31 in parallel with a capacitor 32. The filter provides a high frequency boost superimposed on a general attenuation arising from the potentiometric action of the resistors 30 and 31. The amplifier 13 performs two important functions in relation to the filter. Firstly, it compensates for the attenuation produced by the resistors 30 and 31 and secondly it isolates the filter from the combining circuit 15, whereby the characteristics of the filter are not influenced by the variations of the resistor 17.

Figure 2:
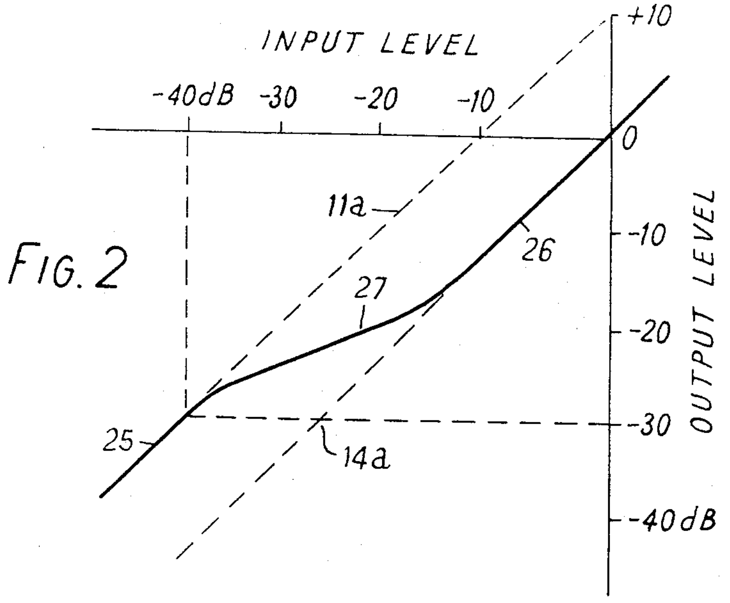
FIG. 2 is an explanatory diagram relating to FIG. 1.

It can therefore be arranged that, well below the turnover frequency of the filter, the characteristic 11a (FIG. 2) is substantially coincident with the characteristic 14a whereby there is no compressor action at such frequencies. Above the turnover frequency, the high frequency boost introduced by the filter 12 creates the situation as shown in FIG. 2, whereby there is compressor action at high frequencies. Therefore the compressor action occurs selectively in the high frequency band. The circuit of FIG. 1 can be used in an audio noise reduction system with the turnover freqency established at say 3 KHz to give high frequency noise reduction.

The capacitor 32 and inductor 32a illustrate the principle as applied to carrier frequency signals.

THE EXPANDER CIRCUIT

Figures 3, 4:
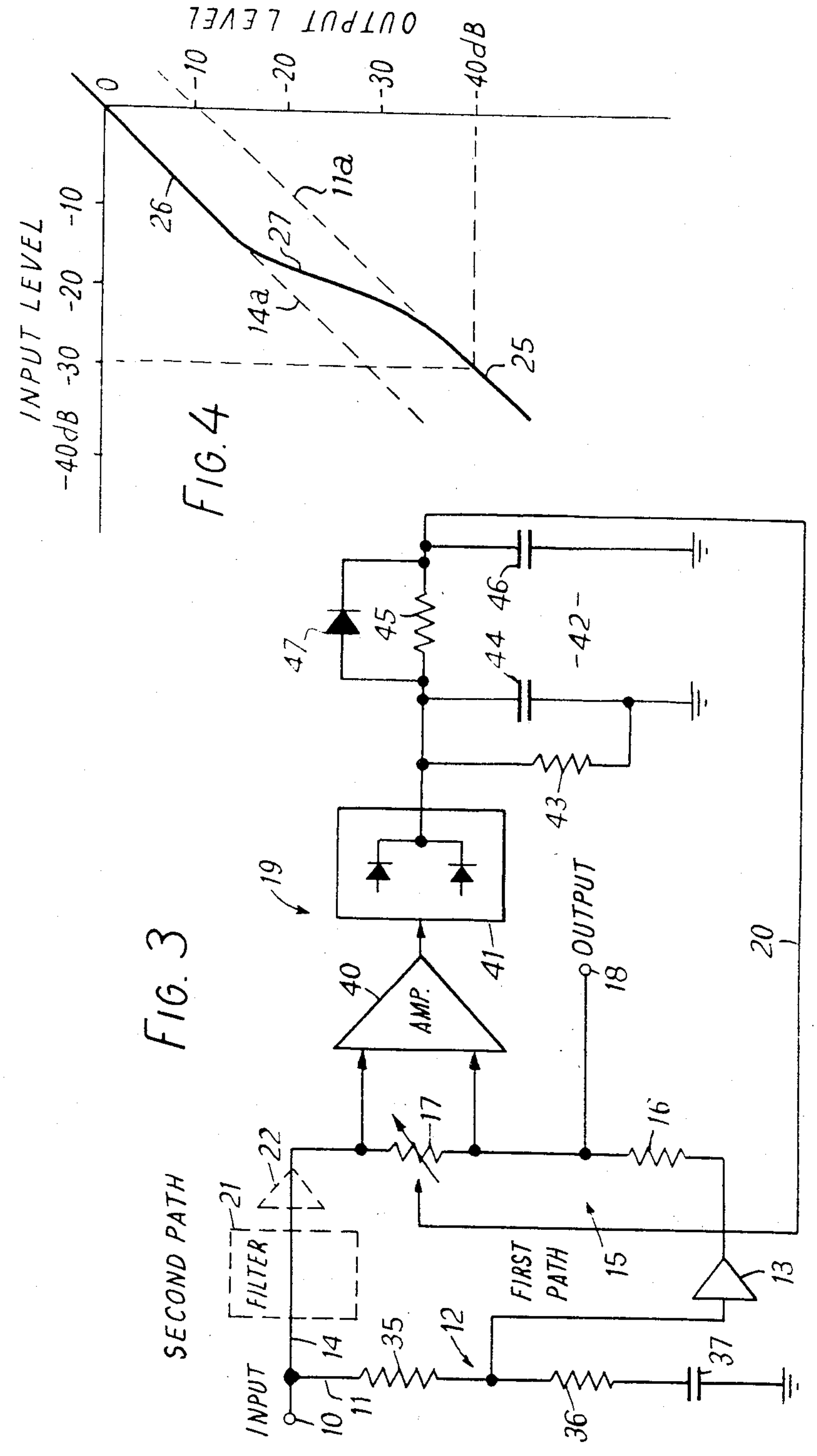
FIG. 3 is a circuit diagram of an expander embodying the invention.
FIG. 4 is an explanatory diagram relating to FIG. 1.

FIG. 3 illustrates a complementary expander circuit with much the same general configuration, for which reason the same reference numerals as in FIG. 1 are employed. The essential difference is that the filter 12 now has a configuration such as to yield high frequency attenuation. To this end the filter consists of a series resistor 35 followed by a shunt arm consisting of a resistor 36 in series with a capacitor 37. Since the high frequency attenuation is now required to establish the expander action the amplifier 13 is not required to introduce gain; it merely serves to isolate the filter from the combining circuit 15 and may consist of an emitter follower.

The high frequency characteristics of the expander circuit (when the capacitor 37 has a low reactance) are therefore as illustrated in FIG. 4 in which the relative positions of the lines 11a and 14a are interchanged with respect to FIG. 2, whereby the dynamic range is expanded.

THE CONTROL CIRCUIT

FIG. 3 also illustrates one form which the control circuit 19 can take in both compressors and expanders. The voltage across the resistor 17 is sensed by a differential amplifier 40, rectified by a rectifier schematically illustrated at block 41, and smoothed by a smoothing circuit 42, to provide the signal on line 20. This signal can control the resistor 17 in various known ways. For example, the resistor 17 can be a field effect transistor or a photosensitive resistor illuminated by a lamp bulb which is energised by the control signal.

The form of smoothing circuit 42 illustrated is suitable for audio applications in which the compressor or expander must act syllabically, i.e., so as to compress the dynamic range without introducing non-linear distortion into the signal. The smoothing circuit comprises a first RC smoothing network formed by a resistor 43 and a capacitor 44 with a relatively short time constant which by itself is insufficient to achieve the required degree of syllabic smoothing action. The first network is followed by a second network comprising a series resistor 45 and a shunt capacitor 46 having a longer time constant, which provides effective control signal smoothing. The resistor 45 is shunted by a diode 47 with an appreciable forward voltage drop. The diode can be a silicon diode, for example, such that no diode current flows unless the voltage drop across the resistor 45 exceeds about 0.6 volts.

Thus, for small fluctuations in the control voltage from the first network, the second network is able to function fully. However, for large increases in signal amplitude, the diode 47 conducts and reduces the time constant of the second network markedly. The attack time of the control circuit 19 is thus made short while at the same time keeping signal distortion and the generation of modulation products to a minimum under more uniform signal conditions.

Expander with Non-linear Limiter

Figure 5:
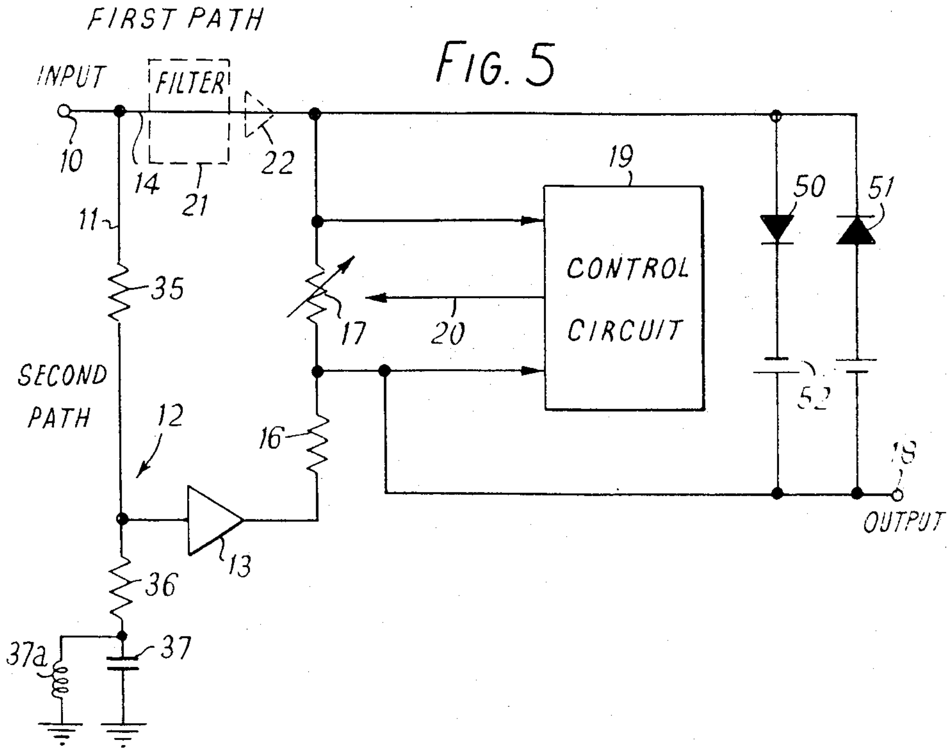
FIG. 5 is a circuit diagram showing a modification of FIG. 3.

FIG. 5 shows a circuit which differs from that of FIG. 3 only in that limiting diodes 50 and 51 in series with suitable bias sources 54 (shown schematically as batteries) are connected between the input terminal 10 and the output terminal 18 and in that a tuned circuit is included for dealing with a carrier frequency. The diodes have the function of preventing the voltage across the variable element of the variable combining means from exceeding a certain small value, as established by the bias, even under extreme transient conditions. Without the diodes the time lag in the control circuit 19 may result in significant modification of high level transient signals. The diodes 51 may also be coupled suitably and biased properly by means of a transformer with a suitable winding ratio, the primary being connected between the two signal points 10 and 18 and the diodes being connected across the secondary. A similar result can be obtained by the use of a differential amplifier with inputs connected to path 14 and point 18, the output of the amplifier being connected through diodes to point 18. while being illustrated in an expander circuit, the transient suppression method described is also applicable to compressor circuits.

The diode circuit also illustrates non-linear combining (i.e., without control circuit 19 and resistor 17), whether in compressors or expanders.

CIRCUITS WITH MORE THAN TWO PATHS

Figure 6:
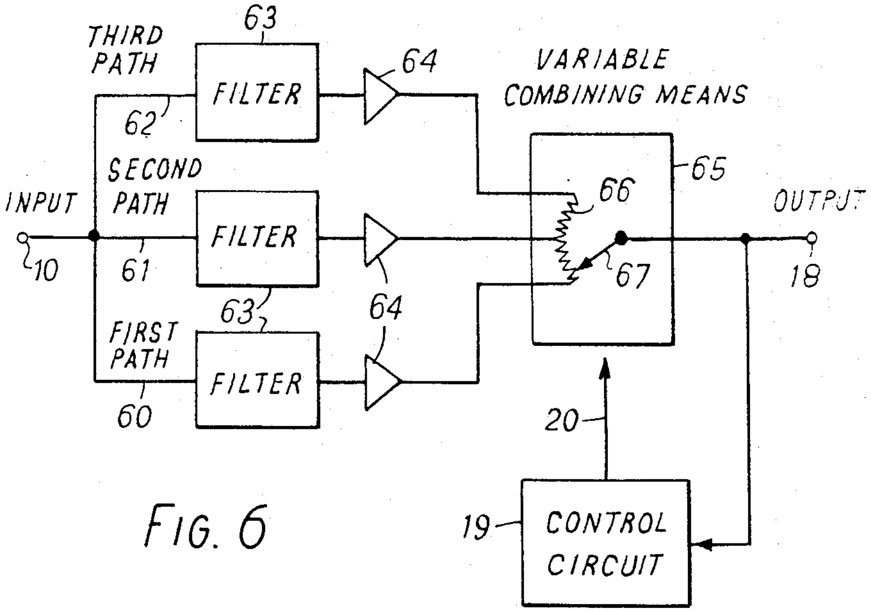
FIG. 6 is a block diagram of a circuit employing more than two paths.

FIG. 6 shows a circuit employing three different paths 60, 61 and 62, any one or more of which can include a filter 63 and/or an amplifier 64. The outputs of the paths are combined in variable proportions by a variable combining means 65 illustrated as a resistor 66 with taps connected to the outputs of the three paths and an adjustable wiper 67 connected to the output terminal 18. The position of the wiper 67 is adjusted in response to the signal on line 20 from the control circuit 19, which is shown as sensing the level of the output signal purely by way of example. The wiper 67 can be positioned by means of a servo-mechanism, although it will be appreciated that a purely electronic arrangement can equally well be employed.

Whether the circuit acts as a compressor or expander will depend upon the relative gains in the three paths 60, 61 and 62 and the circuit may in fact act as a compressor over part of the dynamic range and as an expander over another part of the dynamic range. By appropriate selection of the gains in the different paths, the characteristics of the filters and the response of the variable combining means 65 to the signal level, it is possible to establish a variety of special effects useful, for example, in electronic music synthesizers or special effects equipment for use by popular music groups.

What is claimed is:

1. A signal compressor circuit for reducing, within a predetermined input dynamic range, the dynamic range of an input signal, comprising first and second circuit paths for conducting signal components from an input terminal to an output terminal, each circuit path being linear with respect to dynamic range in its operation, variable combining means coupling the two circuit paths to the output terminal, and a control circuit responsive to the signal level of a signal in the compressor circuit automatically to control the variable combining means so that at low and high levels of the predetermined input dynamic range the signal reaching the output terminal is contributed substantially completely by the first and second circuit paths respectively, whereas at intermediate levels of the predetermined range the signal reaching the output terminal comprises components contributed by both circuit paths, the circuit path gains and the combining means being so arranged that the output signal is boosted at low levels relative to the output signal at high levels.

2. A signal compressor circuit according to claim 1, wherein there are more than two paths and wherein the variable combining means selects the relative proportions in which the outputs of the paths contribute to the output signal in dependence upon the said signal level.

3. A signal compressor circuit according to claim 1, wherein the combining means comprise a fixed impedance connected between the first path and the output terminal, and a variable impedance connected between the second path and the output terminal, and wherein the control circuit is arranged to control the variable impedance so that the impedance thereof is very high and very low, compared with the fixed impedance, when the input signal has a low or high level respectively.

4. A signal compressor circuit according to claim 1, wherein the control circuit which controls the variable combining means includes a first smoothing circuit with a relatively short time constant, followed by a second smoothing circuit having a relatively long time constant under steady signal conditions but having a relatively short time constant when the signal level changes abruptly.

5. A signal compressor circuit according to claim 1, wherein the variable combining means has coupled thereto non-linear limiting means adapted to limit the combining means signal to a small value under transient input signal conditions.

6. A signal compressor circuit according to claim 1, wherein the variable combining means is non-linear in its operation.

7. A signal circuit compressor according to claim 1, wherein at least one of the paths includes a filter with predetermined characteristics, whereby the compressor circuit acts as a frequency selective compressor.

8. A signal compressor circuit according to claim 7, wherein at least one of the filters is adapted to reject a carrier frequency.

9. A signal expander circuit for increasing, within a predetermined input dynamic range, the dynamic range of an input signal, comprising first and second circuit paths for conducting signal components from an input terminal to an output terminal, each circuit path being linear with respect to dynamic range in its operation, the second circuit path including a filter with predetermined characteristics, variable combining means coupling the two circuit paths to the output terminal, and a control circuit responsive to the signal level of a signal in the expander circuit automatically to control the variable combining means so that, at low and high levels of the predetermined input dynamic range, the signal reaching the output terminal is contributed substantially completely by the first and second circuit paths respectively, whereas at intermediate levels of the predetermined range the signal reaching the output terminal comprises components contributed by both circuit paths, the circuit path gains and the combining means being so arranged that the output signal in at least part of the frequency band is attenuated at low levels relative to the output signal at high levels.

10. A signal expander circuit according to claim 9, wherein the first circuit path is linear with respect to frequency in its operation.

11. A signal expander circuit according to claim 9, wherein the first circuit path also includes a filter with predetermined characteristics.

12. A signal expander circuit according to claim 9, wherein there are more than two paths and wherein the variable combining means selects the relative proportions in which the outputs of the paths contribute to the output signal in dependence upon the said signal level.

13. A signal expander circuit according to claim 9, wherein the combining means comprise a fixed impedance connected between the first path and the output terminal, and a variable impedance connected between the second path and the output terminal, and wherein the control circuit is arranged to control the variable impedance so that the impedance thereof is very high and very low, compared with the fixed impedance, when the input signal has the low and high levels respectively.

14. A signal expander circuit according to claim 9, wherein the control circuit which controls the variable combining means includes a smoothing circuit with a relatively short time constant, followed by a second smoothing circuit having a relatively long time constant under steady signal conditions but having a relatively short time constant when the signal level changes abruptly.

15. A signal expander circuit according to claim 9, wherein the variable combining means has coupled thereto non-linear limiting means adapted to limit the combining means signal to a small value under transient input signal conditions.

16. A signal expander circuit according to claim 9, wherein the filter is adapted to reject a carrier frequency.

17. A signal expander circuit according to claim 9, wherein the variable combining means is non-linear in its operation.

18. A signal expander circuit for increasing, within a predetermined input dynamic range, the dynamic range of an input signal, comprising first and second circuit paths for conducting signal components from an input terminal to an output terminal, each circuit path being linear with respect to dynamic range in its operation, a filter with predetermined characteristics in the first circuit path, variable combining means coupling the two circuit paths to the output terminal and a control circuit responsive to the current through or voltage across a variable element of the variable combining means automatically to control the variable combining means so that, at low and high levels of the predetermined input dynamic range, the signal reaching the output terminal is contributed substantially completely by the first and second circuit paths respectively, whereas at intermediate levels of the predetermined range the signal reaching the output terminal comprises components contributed by both circuit paths, the circuit path gains and the combining means being so arranged that the output signal in at least part of the frequency band is attenuated at low levels relative to the output signal at high levels.

19. A signal expander circuit according to claim 18, wherein there are more than two paths and wherein the variable combining means selects the relative proportions in which the outputs of the paths contribute to the output signal in dependence upon the said one or more signal levels, or difference in levels.

20. A signal expander circuit according to claim 18, wherein the combining means comprise a fixed impedance connected between the first path and the output terminal, and a variable impedance connected between the second path and the output terminal, and wherein the control circuit is aranged to control the variable impedance so that the impendance thereof is very high and very low, compared with impednace fixed impedance, when the input signal has the low and high levels respectively.

21. A signal expander circuit according to claim 18, wherein the control circuit which controls the variable combining means includes a smoothing circuit with a relatively short time constant, followed by a second smoothing circuit having a relatively long time constant under steady signal conditions but having a relatively short time constant when the signal level changes abruptly.

22. A signal expander circuit according to claim 18, wherein the variable combining means has coupled thereto non-linear limiting means adapted to limit the combining means signal to a small value under transient input signal conditions.

23. A signal expander circuit according to claim 18, wherein the filter is adapted to reject a carrier frequency.

24. A signal expander circuit according to claim 18, wherein the variable combining means is non-linear in its operation.

* * * * *